Dec. 15, 1964 W. MÖLLER 3,161,067
CRANK GEAR WITH ADJUSTABLE CRANK ARM LENGTH, IN
PARTICULAR FOR ROTARY OSCILLATING TABLES
Filed Aug. 3, 1961 2 Sheets-Sheet 1

INVENTOR.
WALDEMAR MÖLLER
BY
ATTORNEY

Dec. 15, 1964    W. MÖLLER    3,161,067
CRANK GEAR WITH ADJUSTABLE CRANK ARM LENGTH, IN
PARTICULAR FOR ROTARY OSCILLATING TABLES
Filed Aug. 3, 1961    2 Sheets-Sheet 2

INVENTOR.
WALDEMAR MÖLLER
BY
ATTORNEY

United States Patent Office 3,161,067
Patented Dec. 15, 1964

3,161,067
CRANK GEAR WITH ADJUSTABLE CRANK ARM LENGTH, IN PARTICULAR FOR ROTARY OSCILLATING TABLES
Waldemar Möller, Uberlingen (Bodensee), Germany, assignor to Bodenseewerk Perkin-Elmer & Co., G.m.b.H., Uberlingen (Bodensee), Germany
Filed Aug. 3, 1961, Ser. No. 129,131
2 Claims. (Cl. 74—42)

The invention relates to a crank gear with adjustable crank arm length, in particular for rotary oscillating tables. For testing proposes, in particular for examining gyroscopes for auto-pilots it is often necessary to generate distortionless sine-shaped vibrations with adjustable amplitude within a relatively large frequency range. Known crank gears with adjustable crank arm length are generally not suitable for such purposes, since a fine adjustment of the amplitudes of oscillation and a balancing of the gear cause great difficulties. An insufficient balancing of the gear results in disturbing vibrations, especially in the case of higher frequencies of oscillation, which make a satisfactory examination impossible. It is the object of the present invention to provide a crank gear that offers the possibility of a fine adjustment of the crank arm length and an unobjectionable balancing which is also maintained when the crank arm is being adjusted and need not be corrected.

To this end, the crank gear according to the invention is designed in such a way that on a flywheel disk rotating about the crank axis an adjusting lever carrying the crankpin is so eccentrically pivoted that by rotating the adjusting lever the crankpin is adjustable on a circular arc extending through the center of the flywheel disk. Thus the adjustment of the crank arm is effected by rotating an adjusting lever where a transmission gear is being applied and whereby a great exactness can be attained. The positioning of the crankpin on a rotatable adjusting lever makes it possible to fasten a counter-weight on the adjusting lever, which balances the weight of the crankpin bearing and a weight portion of the couple and which contributes to the adjustment of the crankpin. Thereby the point of gravity of the adjusting lever in its bearing axis is maintained with every adjustment of the crankpin. The flywheel disk may then be balanced by a mass distribution balancing the eccentrically positioned crankpin adjustment device whereby this balance is maintained with any adjustment of the crankpin. For balancing the gear it is further necessary that the rocking arm carries a counter-weight balancing the remaining weight portion of the couple.

By means of such a balancing a vibration free operation of the crank gear is achieved so that even rotary oscillations of relatively high frequency can be produced with it.

As an embodiment and application of the invention a rotary oscillating table provided with a crank gear is illustrated in accompanying drawings and described as follows.

A starter motor 1 actuates a flywheel disk 4 having adjustable speed over a multiple-stage change-over gear 2, 2' (not described here in detail) and a magnetic friction clutch. For reading the drive speed a speedometer 5 coupled with the drive shaft of gear 2 is provided, which is to be read with a multiplication factor dependent on the changing-over of gear 2, 2'. This way, the full deflection range of speedometer 5 is available for all switch steps of gear 2, 2'.

Figure 1:
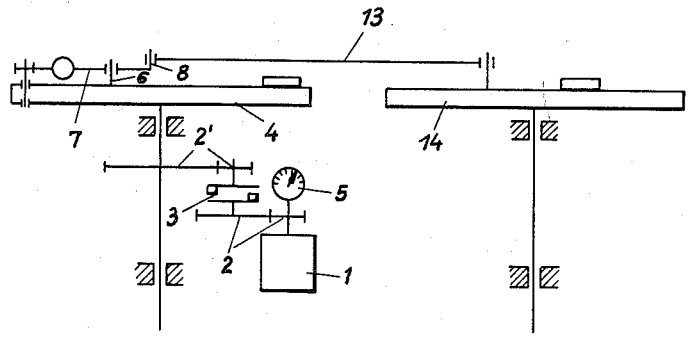
FIG. 1 shows a device of the invention in a simplified side elevational view.
Figure 2:
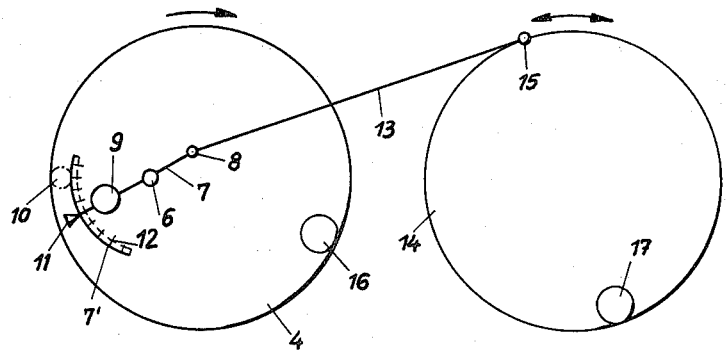
FIG. 2 is a plan view thereof.
Figure 3:
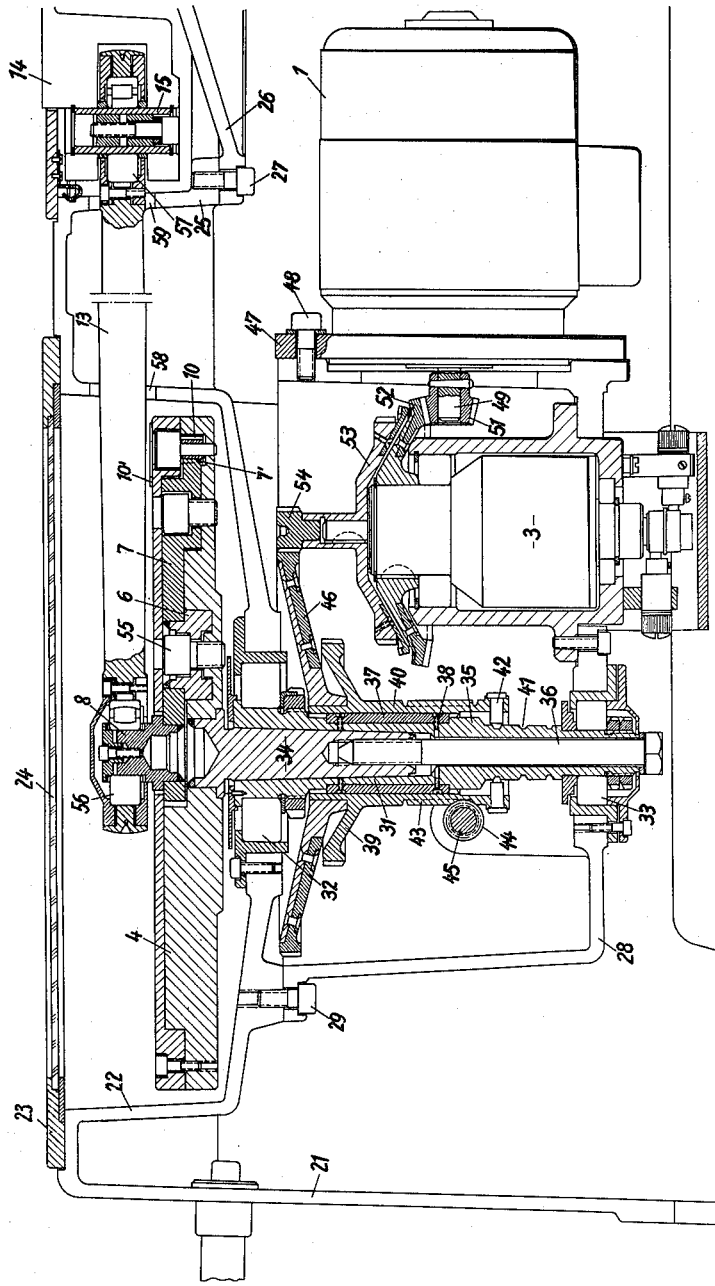
FIG. 3 is a detailed sectional partial view of one embodiment of the invention.

An adjusting lever 7, which carries a crankpin 8, is positioned on an eccentric pivot pin 6, which in turn is positioned on the flywheel disk 4. Beyond pivot pin 6 a counter-weight 9 is fastened on the adjusting lever 7. Furthermore the adjusting lever 7 is provided with a toothed segment 7' in which a pinion 10 positioned on flywheel disk 4 engages. On the toothed segment 7' a dial 12 co-operating with an index 11 is mounted, on which the position of the adjusting lever 7 is readable. A fine adjustment dial 10' (FIG. 3) is connected with pinion 10. By means of pinion 10 the adjusting lever 7 can be initially positioned within a certain range of angles by pivoting it about pivot pin 6. An exact reading of the adjustment is provided on scale 12 and on the fine adjustment scale of pinion 10. Each discrete position which adjusting lever 7 may take within the aforementioned range of angles locates crankpin 8 at a corresponding discrete position. All such positions of crankpin 8 define a circular arc which extends through the center of flywheel disk 4. The adjusting lever 7 is so positioned that during rotation of flywheel disk 4 the crankpin 8 moves around a circle extending through the center of flywheel disk 4 for every initial positioning of adjusting lever 7 except for that one which initially locates crankpin 8 at the center of flywheel disk 4. The length of the crank arm is determined by the distance of crankpin 8 from the center of flywheel disk 4. Therefore, the scales 10 can directly indicate the crank arm length. On crankpin 8 a couple 13 is positioned engaging in bearing point 15 at the edge of a pivoted platform 14 forming the rocking arm. On the platform a test object, e.g. a gyroscope, is being mounted in a manner not shown here.

A balancing weight 16 is fastened on flywheel disk 4. Likewise, a counter-weight 17 is positioned on platform 14 diametrically to bearing point 15.

Counter-weight 9 on the adjusting lever 7 is, taking into account the toothed segment 7' so dimensioned that it balances the weight of the crankpin bearing 8 and half the weight of couple 13. If the adjusting lever 7 is being rotated the point of gravity of the adjusting device remains in pivot pin 6 of the adjusting lever 7 with every position of crankpin 8. By means of suitable mass distribution, e.g. through the balancing weight 16 flywheel disk 4 can be balanced with the eccentric, but always constant-remaining position of the point of gravity of the adjusting system. Counter-weight 17 of platform 14 is so dimensioned that it balances half the weight of couple 13 and the weight of the couple bearing 15. With a suitable proportioning of the counter-weights 9, 16, 17 the crank gear is fully balanced, and no adjusting lever 7 will change this condition.

On starting the crank gear platform 14 executes rotary oscillations the frequency of which depends on the adjustable drive speed to be read on speedometer 5 and the amplitude of which depends on the crank arm length, i.e. on the adjustment of adjusting lever 7. Frequency and amplitude of the so produced rotary oscillations are adjustable within broad limits and with great exactness. Clutch 3 sees to it that when flywheel disk 4 is accelerating the starter motor 1 cannot be overloaded since by means of clutch 3 the maximum torque to be produced by motor 1 is being limited. One detailed embodiment of the invention is partly shown in FIG. 3.

Reference numeral 21 designates the casing of the oscillating table, which on the top on one side, forms a pot-shaped recessed portion 22 containing the adjustment mechanism 4, 6, 7, 8, as will be described hereinbelow, and closed by a cover plate 23 with a glass plate 24. Beside the recessed portion 22 the casing 21 has on opening with a collar 25 extending downwards. A support 26 is affixed to the collar 25 by means of screws 27. The actual rotary oscillating table 14 is rotatably mounted in this support. The rotary oscillating table 14 extends somewhat above the upper surface of the casing and is adapted, in a manner not shown, for receiving an object under test. The table 14 has been shown only in part in FIG. 3.

A pot shaped body 28 is affixed to the recessed portion of the casing 21 by means of screws 29. The flywheel 4 with shaft 31 is mounted in the recessed portion 22 and body 28 by means of roller bearing 32 and 33 respectively. The shaft 31 consists of a conical body 34 and a body 35 having a corresponding recess mounted thereon and affixed thereto by means of a bolt 36. A sleeve 37 is connected to body 35 by means of screws 38. The hub 40 of a gear wheel 39 slides axially on sleeve 37. The body 35 is provided with peripheral grooves 41. Locking means 42 of the hub 40 engage these grooves. The hub 40 can be moved in axial direction from a shaft 45 by means of gear means 43, 44. A further gear wheel 46 is mounted on the hub 40.

Motor 1 has been affixed to body 28 by means of a flange 47 and screws 48. The shaft 49 of the motor 1 is connected to a bevel gear 51 which meshes with a bevel gear 52. The bevel gear 52 is coupled with a gear wheel 53 through the clutch 3. A gear wheel 54 is rigidly connected with gear wheel 53. Depending upon the position of the hub 40, either the gear wheel 46 meshes with gear wheel 54 or the gear wheel 39 meshes with gear wheel 53. Thereby different transmission ratios may be obtained. The locking means engage the grooves 41, in the various operative positions.

An eccentric pin 6 is connected with the flywheel 4 by means of a screw 55. The lever 7 is pivoted on the pin 6, which, on one end, bears the pin 8. Couple 13 is pivoted on pin 8 by means of a roller bearing 56 and is pivoted on pin 15 of the table, at its other end, by means of a roller bearing 57. The couple extends through openings 58, 59 of the recessed portion 22 and the collar 25, respectively.

What I claim is:

1. Apparatus for generating distortionless rotary oscillations comprising:
   a flywheel disc;
   a lever pivotally adjustable about a pivot pin eccentrically affixed to said flywheel disc;
   a crankpin affixed to said lever at such a position that for every pivotal adjustment of said lever said crankpin lies on a circular arc which extends through the center of said flywheel disc;
   means for rigidly fixing said lever to said flywheel disc after said lever has been adjusted to a desired position;
   a rotatable platform;
   a coupling rod fixed to said crankpin and to said rotatable platform;
   a first counterweight fixed to said lever on the opposite side of said pivot pin from said crankpin for balancing the weight of said crankpin and a portion of the weight of said coupling rod;
   a second counterweight fixed to said flywheel disc for balancing said flywheel disc;
   and a third counterweight fixed to said rotatable platform for balancing that portion of the weight of said coupling rod not balanced by said first counterweight.

2. The apparatus of claim 1 wherein the second and the third counterweights are positioned on the edges of the flywheel disc and rotatable platform respectively and the third counterweight is diametrically opposite the point at which the coupling rod is fixed to the rotatable platform.

References Cited in the file of this patent

UNITED STATES PATENTS

| 1,467,214 | White | Sept. 4, 1923 |
| 1,678,447 | Schwenke | July 24, 1928 |
| 1,796,753 | Green | Mar. 17, 1931 |
| 2,250,385 | Maier | July 22, 1941 |
| 2,319,485 | Alabrure | May 18, 1943 |
| 2,348,189 | Buchanan et al. | May 9, 1944 |
| 2,445,710 | Dodge | July 20, 1948 |
| 2,753,721 | Latta | July 10, 1956 |
| 2,793,010 | Menken | May 21, 1957 |
| 2,856,793 | Budlong | Oct. 21, 1958 |

FOREIGN PATENTS

| 611,622 | France | July 12, 1926 |